(12) United States Patent
Lewis

(10) Patent No.: US 11,486,507 B2
(45) Date of Patent: Nov. 1, 2022

(54) GAS SAFETY VALVE AND GAS SUPPLY LINE

(71) Applicant: GAS STOP EUROPE BV, Assen (NL)

(72) Inventor: Chris Andrew Lewis, Devon (GB)

(73) Assignee: GAS STOP EUROPE BV, Assen (NL)

( * ) Notice: Subject to any disclaimer, the term of this patent is extended or adjusted under 35 U.S.C. 154(b) by 0 days.

(21) Appl. No.: 17/380,341

(22) Filed: Jul. 20, 2021

(65) Prior Publication Data

US 2022/0025982 A1   Jan. 27, 2022

(30) Foreign Application Priority Data

Jul. 21, 2020 (GB) ..................................... 2011267

(51) Int. Cl.
| | | |
|---|---|---|
| *F16K 17/00* | (2006.01) | |
| *F16K 17/28* | (2006.01) | |
| *F16K 37/00* | (2006.01) | |
| *F16K 15/04* | (2006.01) | |

(52) U.S. Cl.
CPC ............ *F16K 17/285* (2013.01); *F16K 15/04* (2013.01); *F16K 37/0091* (2013.01)

(58) Field of Classification Search
CPC ...... F16K 17/285; F16K 17/366; F16K 17/12; Y10T 137/7727
See application file for complete search history.

(56) References Cited

U.S. PATENT DOCUMENTS

| | | |
|---|---|---|
| 4,921,008 A | 5/1990 | Foster |
| 5,022,435 A | 6/1991 | Jaw-Shiunn |
| 8,714,191 B2 * | 5/2014 | Foster ..................... F16K 17/30 |
| | | 137/460 |

FOREIGN PATENT DOCUMENTS

GB           2243668 A        6/1991

OTHER PUBLICATIONS

GB Search Report in corresponding GB Application No. 2011267.8 dated Nov. 9, 2020.

* cited by examiner

*Primary Examiner* — Reinaldo Sanchez-Medina
(74) *Attorney, Agent, or Firm* — Bacon & Thomas, PLLC

(57) ABSTRACT

A gas safety valve for controlling a gas flow includes a valve body providing a body inlet port for coupling to a first gas supply and a body outlet port for coupling to an appliance, the valve body extending along a longitudinal axis between the body inlet port and the body outlet port, the valve body further providing an inlet bore extending downstream from the body inlet port, and an outlet bore extending to the body outlet port. A valve has a valve chamber having a valve inlet and a valve outlet, a ball located within the valve chamber and a valve seat provided at the valve outlet such that the ball is retained in the valve chamber upstream of the valve seat. The valve body includes an internal junction positioned upstream of the valve inlet, and a side inlet port.

20 Claims, 6 Drawing Sheets

GAS SAFETY VALVE AND GAS SUPPLY LINE

FIELD OF THE INVENTION

The present disclosure relates to a gas safety valve, in particular a gas safety valve comprising a side inlet port for allowing coupling of a second gas supply. It also relates to a gas supply line incorporating such a gas safety valve and a method of supplying gas to an appliance.

BACKGROUND OF THE INVENTION

Gas safety valves are known and are used as safety devices in gas supply lines between gas supplies and appliances in order to shut off the supply of gas to the appliance or appliances in the event a leak develops downstream of the gas safety valve.

Gas safety valves may have a valve comprising a ball, which is retained in a valve chamber. Gas enters the valve chamber through a valve inlet and exits through a valve outlet as it passes through the gas safety valve. The size and weight of the ball can be selected so that the ball, when the gas safety valve is in normal use, rests away from a valve seat to allow a supply of gas to exit to the appliance. This happens when a pressure difference across the valve is at an allowable level or below, as a rate of gas flow in the valve chamber is not sufficient to lift the ball up into contact with the valve seat. If a leak develops downstream of the gas safety valve, for example, in the gas supply line to the appliance or due to a fault in the appliance itself, a pressure difference across the valve increases as pressure falls on a downstream side. This causes gas to flow through the valve at an increased flow rate, whereupon the rate of gas flow may be sufficient to lift up the ball within the valve chamber to bring it into contact with the valve seat and seal off the gas supply.

The valve seat usually comprises an O-ring seal that the surface of the ball seals against to shut off the valve. To reset the gas safety valve, the valve may be provided with a pressure gauge mounted onto an end of a stem that extends upwardly from the valve body of the valve. The stem may be slidably retained within a collar joining the stem and pressure gauge assembly to the valve body, allowing the stem to be depressed against a bias along an axis of the stem towards the valve body by a user pressing on the pressure gauge to reset the valve after a pressure difference between the inlet bore and the outlet bore has exceeded an allowable level.

Existing gas safety valves are usually made from a casting which is machined to provide the internal bores and ports. The valves are arranged to be coupled to a single gas supply. Whilst fittings are known which could be used in combination with such gas safety valves to couple the gas supply line to a second gas supply where that is desirable, each additional fitting introduces another risk in where a fault can develop, for example, through parts unscrewing. There may also be constraints in terms of the location of existing parts of a gas supply line or access volume. It would be desirable to provide a gas safety valve that can be used with more than one gas supply and which uses a ball retained within a valve chamber that is sensitive to a rate of gas flow.

SUMMARY OF THE INVENTION

Viewed from a first aspect, the present disclosure can be seen to provide a gas safety valve for controlling a gas flow. The gas safety valve comprises a valve body providing a body inlet port for coupling to a first gas supply and a body outlet port for coupling to an appliance, the valve body extending along a longitudinal axis between the body inlet port and the body outlet port, the valve body further providing an inlet bore extending downstream from the body inlet port, and an outlet bore extending to the body outlet port. The gas safety valve also includes a stem having a stem axis extending away from the valve body, the stem being supported at a first end by a collar mounted to the valve body. The gas safety valve is also provided with a pressure gauge mounted to a second, distal end of the stem, for displaying a gas pressure. The gas safety valve also includes a valve provided within the valve body between the inlet bore and the outlet bore, the valve comprising a valve chamber having a valve inlet and a valve outlet, a ball located within the valve chamber and a valve seat provided at the valve outlet such that the ball is retained in the valve chamber upstream of the valve seat. The ball is arranged to, in normal use, rest away from the valve seat to allow a supply of gas to the body outlet port when a pressure difference between the inlet bore and the outlet bore is at an allowable level, or below, where a rate of gas flow in the valve chamber is not sufficient to lift the ball up into contact with the valve seat. The ball is also arranged to seal against the valve seat to shut off the supply of gas to the body outlet port when a pressure difference between the inlet bore and the outlet bore exceeds the allowable level and is capable of creating sufficient gas flow through the valve chamber to lift the ball into contact with the valve seat. The valve body additionally comprises an internal junction positioned upstream of the valve inlet, and a side inlet port, the side inlet port feeding into the inlet bore at the junction for supplying an appliance, when coupled downstream of the gas safety valve, with a second gas supply when the second gas supply is coupled to the side inlet port.

Thus a gas safety valve is provided that can be coupled to a second gas supply, for example, a second gas canister. This might be desirable for a mobile home, caravan or boat, where it is usual to carry a spare gas canister and it would be undesirable to have to reconnect a gas supply in the event one ran out of gas. In such applications, space for gas fittings can be limited. It may also be desirable to fit the gas safety valve into an existing gas supply configuration without having to alter the position of existing components, for example, as a retrofit or in an existing production line.

The arrangement of the side inlet port feeding into the inlet bore at an internal junction which is positioned upstream of the valve inlet allows gas to enter the inlet bore and flow into the valve chamber in a functionally similar way to gas flowing into the valve chamber from a first gas supply coupled to the body inlet port and entering the valve chamber via the inlet bore. In this way, the dimensions of the valve chamber and the properties of the ball can be maintained as previously, and because it is shared by both gas supplies, there are no noticeable changes in the operation of the gas safety valve when the second gas supply is used in preference to the first gas supply. Existing gas ratings can be met using either gas inlet port and the physical changes to the valve body to accommodate the additional side inlet port are minimal. In this way, the gas safety valve can be incorporated into an existing gas supply line arrangement with minimal follow on consequences.

The side inlet port may comprise a side inlet port axis and a side inlet port internal diameter D to receive a side port fitting, wherein in the internal junction where the side inlet port and the inlet bore meet, the side inlet port axis may intersect the longitudinal axis at a distance of greater than or equal to D/2 from the valve inlet.

In this way, the side inlet port can be provided in part of the valve body without affecting the working of the valve chamber. A side inlet fitting, when mounted in the side inlet port, has a bore of smaller diameter than the side inlet port diameter D, allowing a section where the gas can flow along the inlet bore prior to passing through the valve inlet. Preferably the side inlet port axis intersects the longitudinal axis at a distance of greater than D/2 from the valve inlet, for example, at a distance of substantially 0.7 D to 1.2 D.

The inlet bore may have an inlet bore diameter d at least adjacent the valve inlet, wherein the downstream edge of the junction of the inlet bore with the side inlet port is positioned upstream at a distance of d or greater from the valve inlet, such that the inlet bore extends upstream with an inlet bore diameter d for a distance of d or greater from the valve inlet. In this way, the gas flow, even if supplied by a second gas supply, can travel along a portion of the inlet bore in the same way as if it was coming from a first gas supply prior to entering the valve chamber. Any possible turbulence on the gas flow from the second gas source or adverse influence on the ball in the valve chamber can also be minimised.

A side inlet fitting may be mounted in the side inlet port of the valve body. The side inlet fitting may comprise a non-return valve configured to allow gas to enter the inlet bore of the valve body. The gas safety valve may be supplied with the side inlet fitting already mounted in the side inlet port.

To minimise ingress of debris when the side inlet fitting is not in use, the side inlet fitting may comprise a cap which can be unscrewed from the side inlet fitting when the side inlet port is to be coupled to a second gas source. The cap may be retained by a flexible retainer to the side inlet fitting to prevent loss of the cap when it has been unscrewed from the side inlet fitting.

The side inlet fitting (and side inlet axis) may extend at right angles to the longitudinal axis. In particular, the side inlet fitting (and side inlet axis) may extend from the valve body in a 270° direction when the gas safety valve is viewed from above the pressure gauge with the body inlet port extending in a 0° direction and the body outlet port extending in a 180° direction. Such a right-handed projection allows the gas safety valve to be connected in existing gas supply lines of some mobile homes, for example. The right-angled arrangement also helps to minimise risk of the gas safety valve from unscrewing from the respective gas supplies. The side inlet fitting (and side inlet axis) may also be arranged at right angles to the stem axis.

The valve chamber may have a bore, for example, a cylindrical bore, with an axis aligned with the stem axis, and the valve inlet may be defined by an aperture formed in the valve body by the intersection of the inlet bore with the bore of the valve chamber. A base of the valve chamber may be perpendicular to the stem axis and the intersection of the inlet bore with the bore of the valve chamber may define a substantially D-shaped aperture, through which gas must flow to enter the valve chamber.

The shape of this aperture, the valve chamber, the valve outlet, and the ball may be as currently used and already proven to meet gas control parameters. The ball may rest on the base of the valve chamber when gas flow past the ball is at a low level. The ball should be sized and configured to allow the ball to move within the valve chamber towards the valve seat under the influence of the gas flow within the valve chamber.

The valve body may comprise a casting which has been machined to provide the inlet bore, the outlet bore, the valve chamber, the body inlet port, the side inlet port, and the outlet port. It may also be machined to provide internal screw threads for attachment of fittings at the body inlet port and/or the side inlet port. Other than the provision of the side inlet port, the casting and machining of the valve body may be as existing.

The gas safety valve may further comprise a body inlet fitting mounted in the body inlet port, which body inlet fitting is provided with a non-return valve and a coupling end configured to couple with a first gas supply. The configuration of the coupling end may be in accordance with a standard coupling configuration. The gas safety valve may be supplied with the body inlet fitting already provided and mounted in the body inlet port.

The stem may extend perpendicularly to the longitudinal axis of the valve body. The stem may hold the pressure gauge perpendicularly to the stem such that a plane of the pressure gauge extends parallel to the longitudinal axis of the valve body.

The stem may be slidably retained within the collar, wherein the stem can be depressed against a bias along the stem axis towards the valve body by a user pressing on the pressure gauge to reset the valve after a pressure difference between the inlet bore and the outlet bore has exceeded the allowable level.

In this way, the gas safety valve can be of a type that uses a pressure gauge, which also serves the purpose of displaying a gas pressure of a coupled gas supply, as a "reset button" for the user to depress to reset the valve by displacing the ball from the valve seat. Thus, the first end of the stem may be provided with a plunger which can project through the valve seat when the stem is depressed in order to push the ball away from the valve seat to reset the gas safety valve and allow a supply of gas to the body outlet port.

The valve seat may be in the form of a resilient O-ring. For example, the valve seat may comprise a rubber or elastomeric O-ring seal. The internal diameter of such an O-ring is smaller than the diameter of the ball, so that a good seal can be made during a shut-off action.

The collar may be seated within a boss of the valve body, such that a first end face of the collar abuts against a base of the boss. The first end face of the collar may be provided with recesses, wherein the recesses form channels with the base of the boss to guide a supply of gas from the valve outlet to a return passage provided in the valve body that opens into the outlet bore leading to the body outlet port.

Through such an arrangement, there is no direct, straight through connection along the longitudinal axis between the inlet bore and the outlet bore. Instead, the gas must exit the valve outlet and run through a channel defined by the recesses and the return passage to the outlet bore.

The collar may comprise a central aperture extending from the first end face to a second end face of the collar. The recesses in the first end face of the collar may comprise an annular recess and at least one radially extending recess that links the annular recess to the central aperture.

According to a second aspect, the present disclosure may also be seen to provide a gas supply line comprising a gas safety valve for controlling a gas flow as described in any of the statements above (including the optional features in any combination). The gas supply line may further comprise a body inlet fitting mounted in the body inlet port of the gas safety valve. The gas supply line may also comprise a first gas supply positioned upstream of the gas safety valve and coupled to the body inlet fitting for supplying gas to the gas safety valve. The gas supply line may also comprise a side inlet fitting mounted in the side inlet port of the gas safety valve. The gas supply line may further comprise a second gas supply positioned upstream of the gas safety valve and coupled to the side inlet fitting for supplying gas to the gas safety valve. The gas supply line may comprise a gas regulator coupled to the body outlet port of the gas safety valve. The gas supply line may comprise a gas line coupled to the gas regulator for conveying gas from the gas regulator between an upstream end and a downstream end thereof. Further the gas supply line may comprise an appliance coupled to the downstream end of the gas line arranged to receive gas from the first or second gas supply.

The appliance may be any gas consuming device, in particular one where the gas is burnt to generate heat or light for a user. For example, it might be one of a gas barbeque, gas stove, gas heater, gas light, or electrical generator.

The side inlet fitting may be coupled to the second gas supply by a gas pipe. The gas pipe may comprise an end configured to connect to the second gas supply, which, as with the body inlet fitting already mentioned, may comprise a similar standard coupling configuration.

According to a third aspect, the present disclosure may be seen to provide a method of supplying gas to an appliance using a gas supply line as described in any of the statements above, and supplying gas from at least one of the first gas supply or the second gas supply to the appliance in a controlled manner. In this way, if gas escapes the gas supply line as a result of a leak or a fault in the appliance, gas from the first and second gas supplies is shut off from the appliance at the gas safety valve.

BRIEF DESCRIPTION OF THE DRAWINGS

Certain embodiments of the present disclosure will now be described in greater detail by way of example only and with reference to the following figures, in which.

DETAILED DESCRIPTION OF THE INVENTION

Figure 1A:
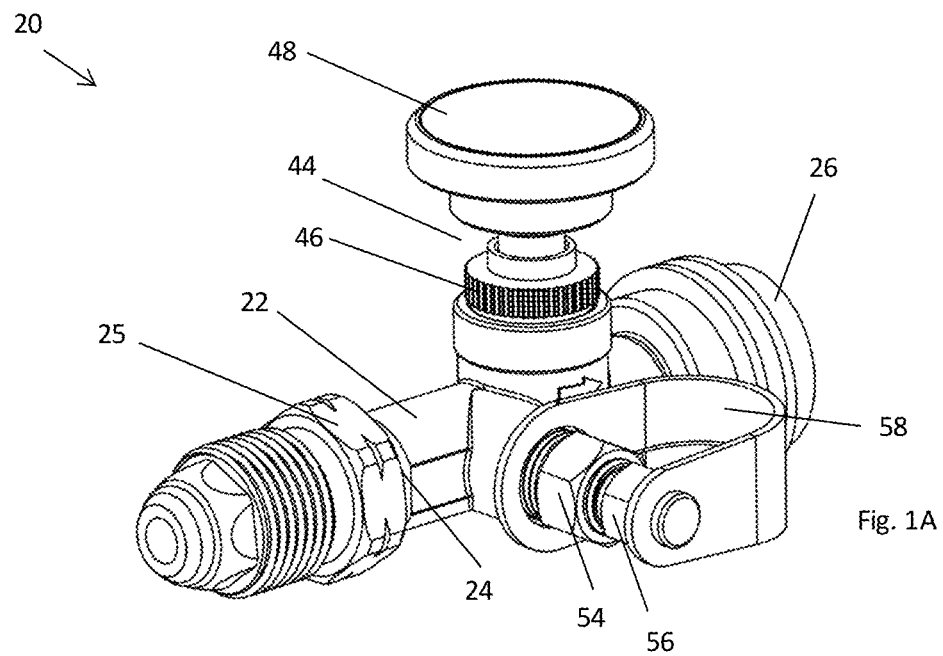
FIG. 1A shows a perspective view of a gas safety valve.
Figure 1B:
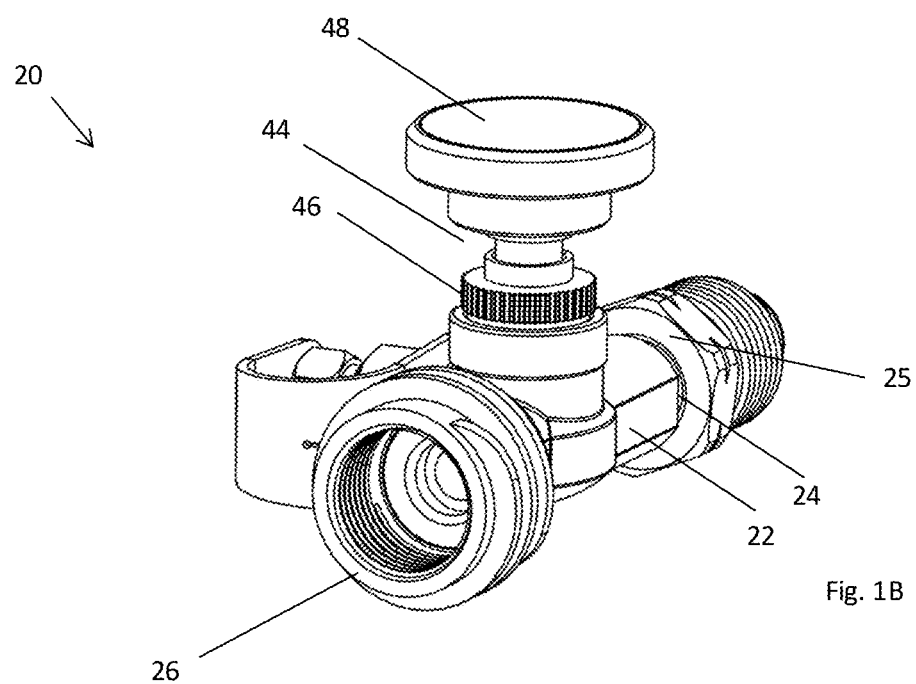
FIG. 1B shows an alternative perspective view of a gas safety valve.
Figure 2:
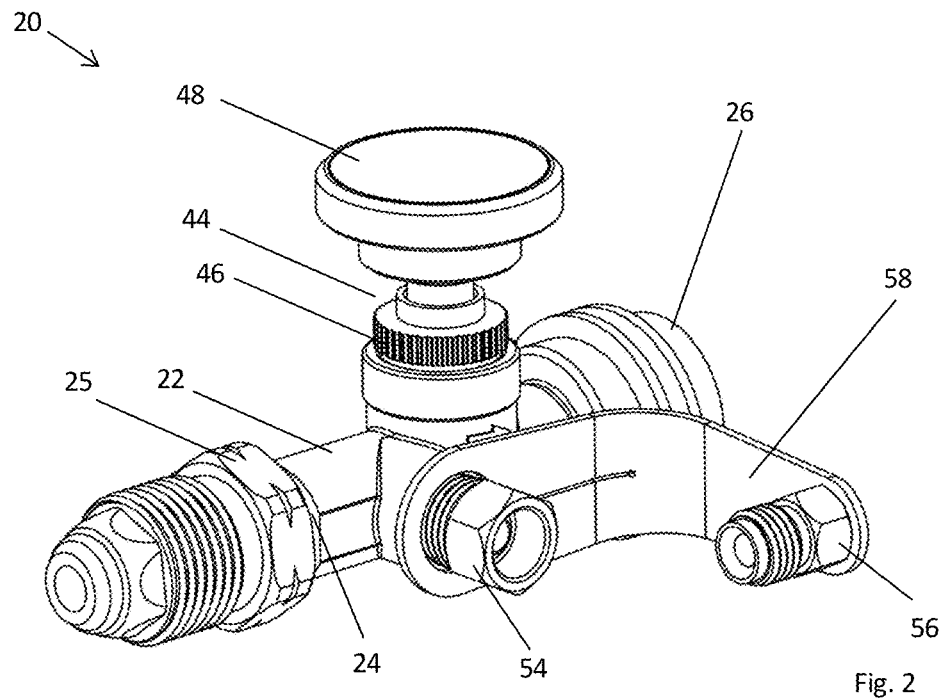
FIG. 2 shows the gas safety valve of FIG. 1A, wherein the cap of the side inlet fitting is unscrewed from the side inlet fitting.

FIG. 1A is a perspective view of a gas safety valve 20. The gas safety valve 20 comprises a valve body 22 extending along a longitudinal axis A with a body inlet port 24 located at one end of the valve body 22 and a body outlet port 26 located at the opposite end of the valve body 22. The longitudinal axis A extends between the body inlet port 24 and the body outlet port 26. The valve body 22 may comprise a single piece casting which has been machined to provide bores and screw threads to direct a flow of gas and to connect with other components. FIG. 1B is a perspective view of the gas safety valve 20 from the opposite direction.

The gas safety valve 20 may further comprise a valve body inlet fitting 25 mounted in the body inlet port 24. The gas safety valve 20 may be supplied with the valve body inlet fitting 25 already provided and mounted in the body inlet port 24. The valve body inlet fitting 25 may be provided with a non-return valve and a coupling end, wherein the coupling end is configured to couple with a first gas supply and is in accordance with a standard coupling configuration.

The gas safety valve 20 is for use in-line in a gas supply, between a gas supply, for example, a gas canister (not shown), upstream of the gas safety valve 20, and a gas pipe (not shown) coupling the gas supply to a gas regulator (not shown) and ultimately to an appliance (not shown) that is arranged to consume the gas, such as (but not exclusively) a gas barbeque, gas stove, gas heater, gas light, electrical generator or other such gas using product. Their purpose is to provide a shut-off function in the event that a major leak develops in a downstream part of the gas supply line to the appliance. The gas safety valve 20 can be reset by pressing down on the pressure gauge 48 as will be explained below.

Figure 4:
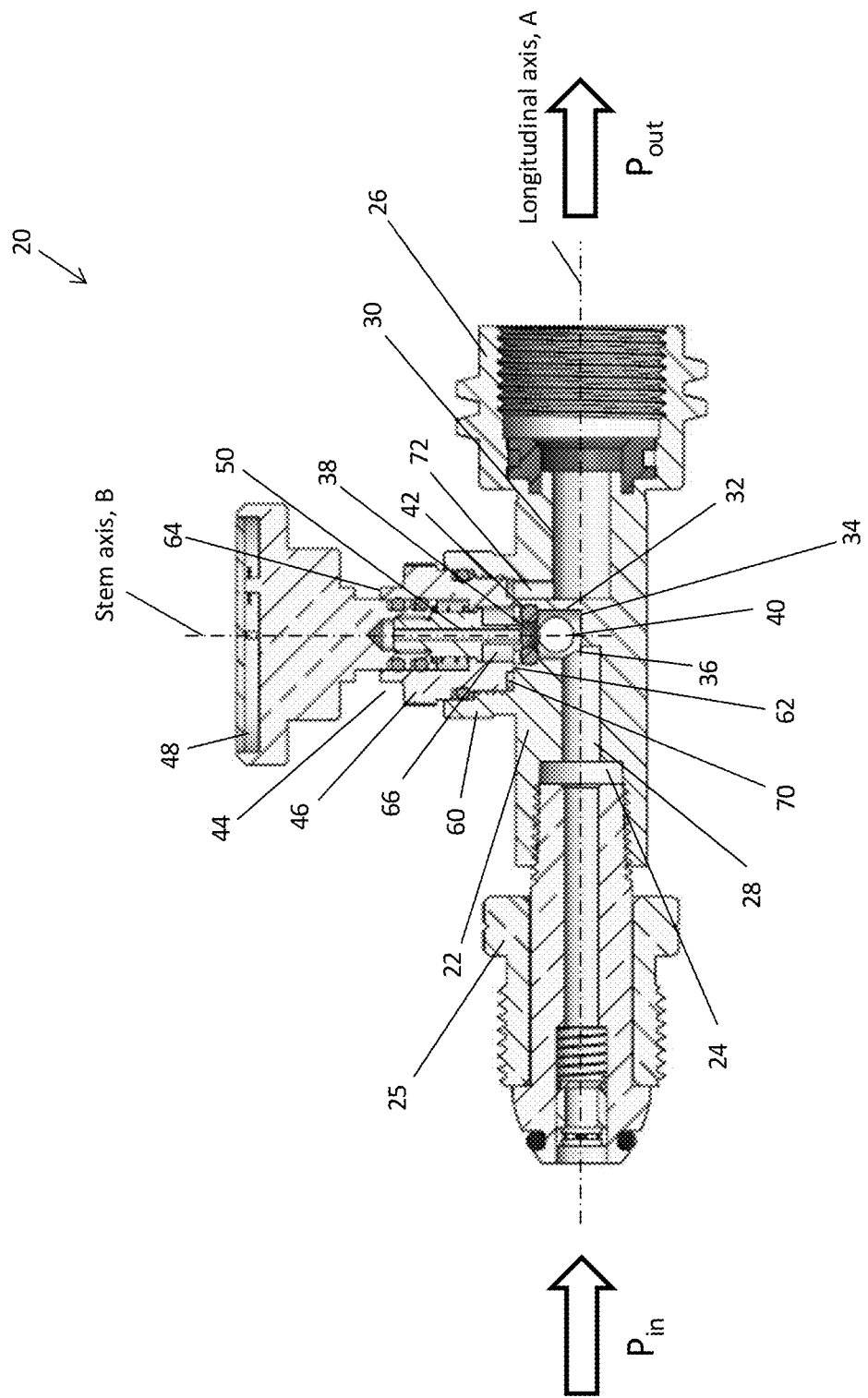
FIG. 4 shows a cross-section through the gas safety valve of FIG. 1A.

FIG. 4 shows a cross-section through the gas safety valve 20 of FIG. 1A along the longitudinal axis A. As shown, the valve body 22 is further provided with an inlet bore 28, an outlet bore 30, and a valve 32. The valve 32 is located between the inlet bore 28 and the outlet bore 30. The valve 32 comprises a valve chamber 34 with a valve inlet 36 and a valve outlet 38. The inlet bore 28 extends downstream from the body inlet port 24 to the valve inlet 36, fluidly connecting the body inlet port 24 to the valve chamber 34. The outlet bore 30 fluidly connects the valve outlet 38 to the body outlet port 26, as will be described in further detail later with reference to FIG. 7.

A ball 40 and a valve seat 42 are located within the valve chamber 34. The valve seat 42 is located at the valve outlet 38, retaining the ball 40 within the valve chamber 34 in a position upstream of the valve seat 42.

The gas safety valve 20 is further provided with a stem 44 that extends away from the valve body 22 along a stem axis B. The stem axis B may extend in a direction perpendicular to the longitudinal axis A, as shown in FIG. 1A and FIG. 4. The stem 44 is supported at a first end by a collar 46 mounted to the valve body 22. A pressure gauge 48 is mounted to a second, distal end of the stem 44. The stem 44 may be slidably retained within the collar 46, such that the stem 44 is able to move along the stem axis B.

During normal use, i.e. when the pressure difference between the inlet bore 28 and the outlet bore 30 is at least at an allowable level where a rate of gas flow in the valve chamber is not sufficient to lift the ball up into contact with the valve seat, the ball 40 is allowed to fall back to rest in the valve chamber 34 at a location away from the valve seat 42 under the effect of gravity. The ball 40 can be chosen to have an appropriate mass such that it is lifted into contact with the valve seat 42 by the flow of gas within the valve chamber 34 when a pressure difference exceeds the allowable level. The considerations for the mass of the ball 40 may take into account factors like the size of the ball 40 and its surface area exposed to the gas flow as well as the speed of flow of the gas past the ball 40 in the valve chamber 34, When the ball 40 is in this lower, resting position, a supply of gas entering the body inlet port 24 is able to pass from the inlet bore 28 into the valve chamber 34, then through the valve outlet 38 into the outlet bore 30, where it can exit the gas safety valve 20 through the body outlet port 26.

If a fault arises and gas is able to escape from downstream of the gas safety valve 20, the pressure of the gas leaving the gas safety valve 20 will drop, causing a pressure difference between the inlet bore 28 and the outlet bore 30 to develop which is above the allowable level. Such a fault can include, for example, a leak in a line supplying gas downstream of the gas safety valve 20 to a regulator or an appliance that is intended to consume the gas.

When such a pressure drop occurs, the difference in pressure between the inlet bore 28 and the outlet bore 30 causes the ball 40 to be drawn upwards (by the flow of gas passing the ball 40 and creating a thrust working against the force of gravity) and into contact with the valve seat 42, thus creating a seal against the valve seat 42. In this position, the ball 40 and valve seat 42 prevent any gas supplied from the inlet bore 28 from passing through the valve outlet 38 into the outlet bore 30. The ball 40 is held in this raised position by the pressure difference and by compliance in the valve seat 42, which is in the form of a resilient O-ring.

A user may be alerted to the loss of gas by the pressure gauge 48 showing a drop in pressure to the appliance (e.g., by movement of a needle on a dial towards a region indicating as such), and by the appliance no longer working. This enables the user to identify that a fault has occurred and to act accordingly to resolve the issue, e.g. by turning off the faulty gas supply and then checking to identify a leak.

Once the fault (leak) has been identified and fixed, the user can reset the valve 32 by pressing on the pressure gauge 48. The pressure gauge 48 therefore has a second function and acts as a button that the user can press to reset the valve 32.

Figure 6:
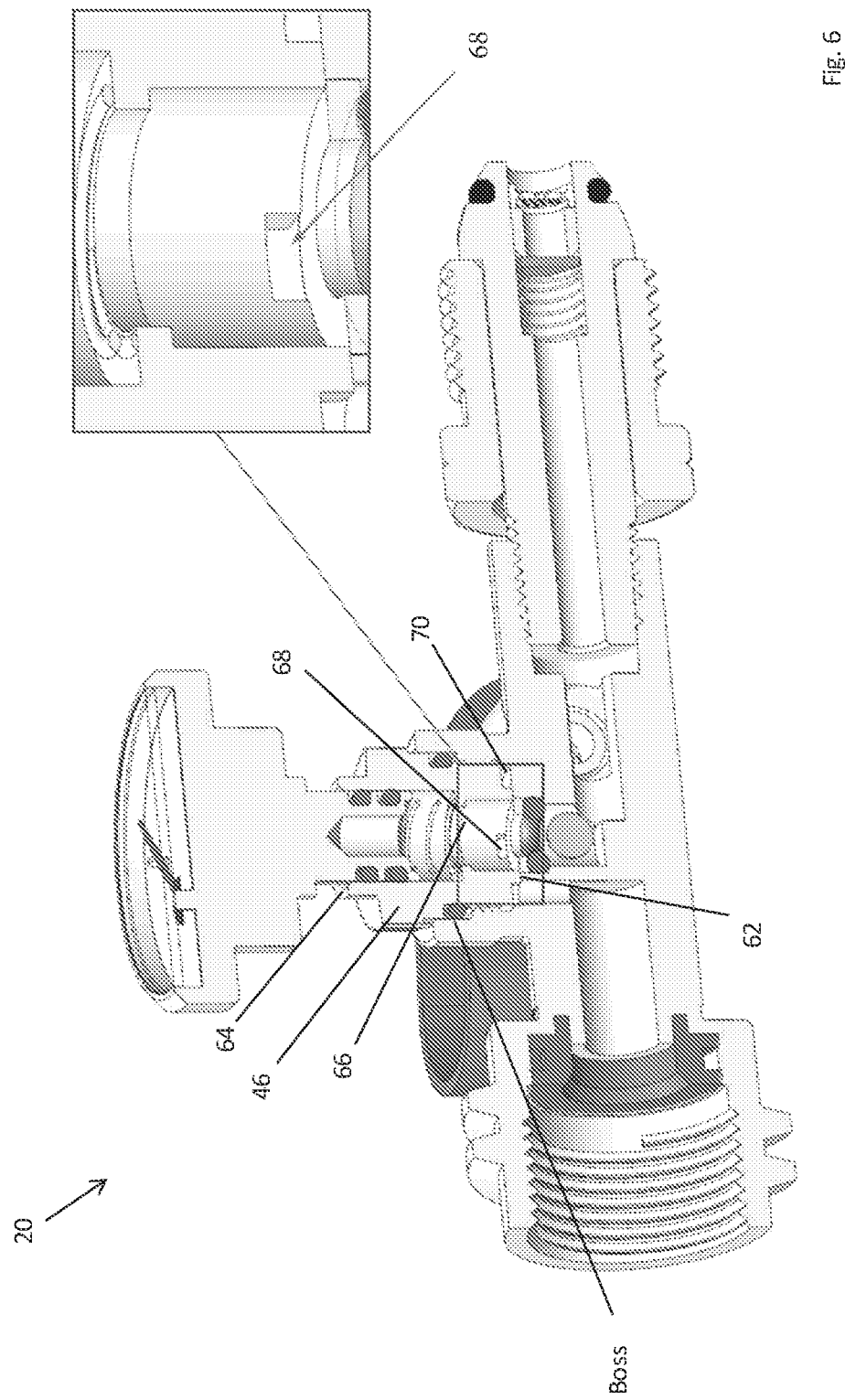
FIG. 6 shows a perspective view of a cross-section through a gas safety valve, where the collar of the gas safety valve is more clearly shown.

The gas flow past the ball 40 is controlled in part by an aperture at the valve inlet 36, created by the intersection of a bore providing the valve chamber 34 and the inlet bore 28. The bore of the valve chamber 34 may be cylindrical and comprise a base as shown in FIG. 6. The downstream end of the inlet bore 28 may be formed with a similar flat end. The intersection of the inlet bore 28 may then create a D-shaped aperture when the two bores intersect at right angles, preferably with the base of the bore of the valve chamber being substantially aligned with the longitudinal axis A and the end of the inlet bore 28 being positioned upstream of the valve chamber axis by a small amount (e.g., 10-20% of the diameter of the valve chamber 34).

The action of pressing the button depresses the stem 44 along the stem axis B towards the valve body 22 against a bias. The stem 44 may be provided with a plunger 50, which extends from a lower end, such that the plunger 50 is able to project through the valve seat 42 when the stem 44 is depressed by the user. The plunger 50 pushes the ball 40 away from the valve seat 42, causing the valve 32 to be reset. Once the valve 32 is reset, gas is once again able to flow through the valve outlet 38 to the outlet bore 30.

Figure 5:
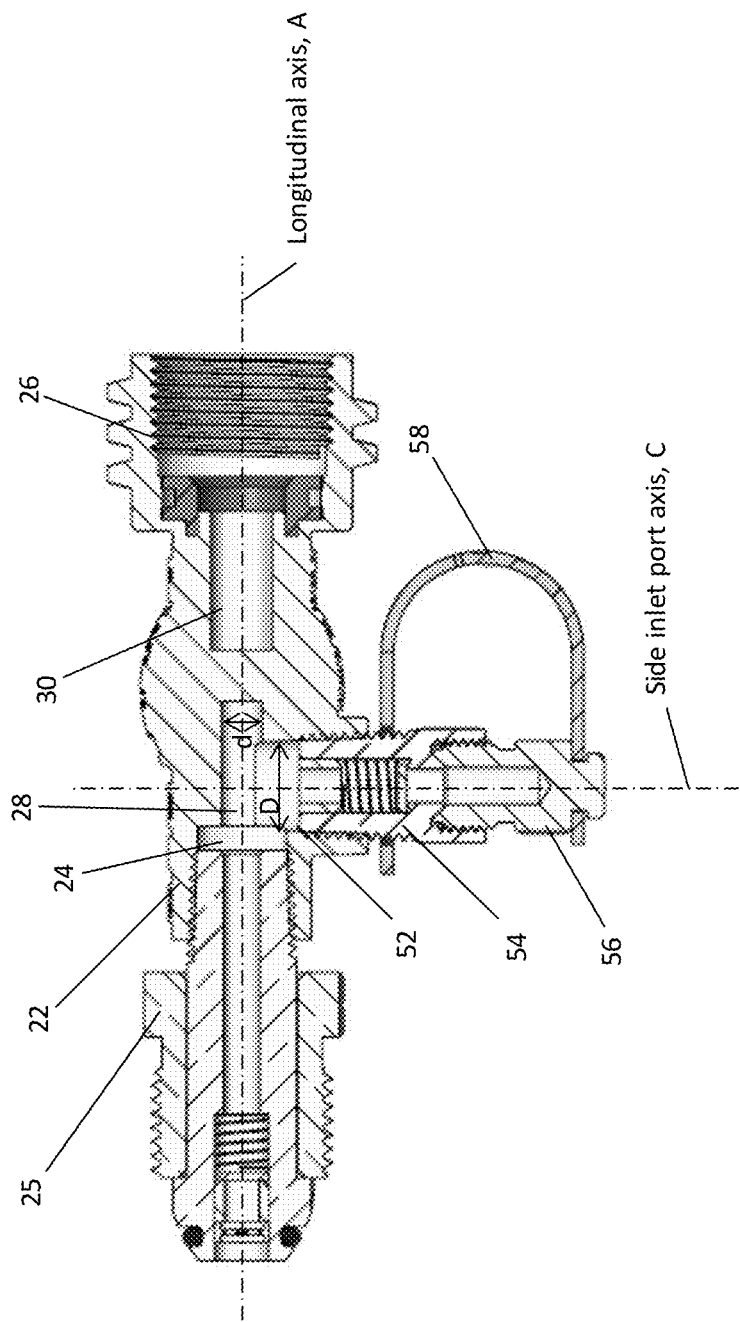
FIG. 5 shows a cross-section through the gas safety valve of FIG. 1A when viewed from looking down the stem axis.

Referring now to FIG. 5, the valve body 22 of the gas safety valve 20 is further provided with a side inlet port 52. The side inlet port 52 is fluidly connected to the inlet bore 28 at a junction positioned upstream of the valve 32. The side inlet port 52 extends along a side inlet port axis C. The side inlet port axis C may be oriented perpendicular to the longitudinal axis A, as shown in FIG. 5 and/or orientated perpendicular to the stem axis B. In particular, the side inlet port 52 and its axis C, when viewed from above the pressure gauge 48 looking down the stem axis B with the gas safety valve 20 extending away from the observer in a flow direction, may be seen to project from the right-hand side of the valve body 22.

Figure 3:
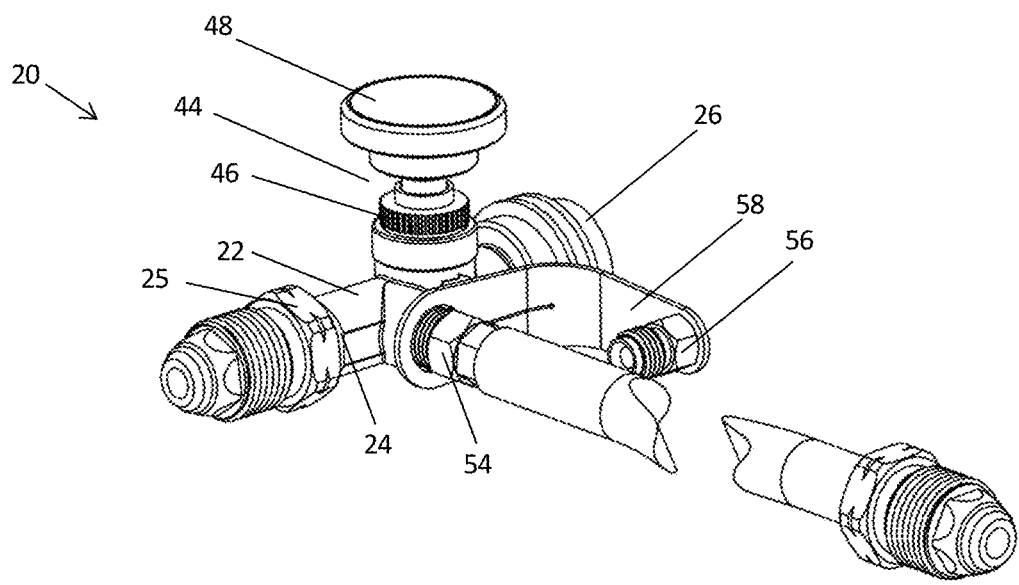
FIG. 3 shows the gas safety valve of FIG. 1A, wherein the side inlet fitting is coupled to a gas pipe.

The side inlet port 52 allows a second gas supply, e.g. a back-up gas supply, which could be in the form of a second gas canister, to be fluidly connected to the gas safety valve 20 upstream of a gas regulator and an appliance. The side inlet port 52 may be connected to a second gas canister by means of a length of flexible tubing with suitable couplings provided at each end, e.g., as shown in FIG. 3.

The junction between the side inlet port 52 and the inlet bore 28 is positioned such that it is upstream of the valve inlet 52 but does not interfere with the coupling of the body inlet port 24.

As the side inlet port 52 is located upstream of the valve inlet 52, the safety mechanism formed by the ball 40 and valve seat 42 can be used to prevent gas from flowing from either the side inlet port 52 or the body inlet port 24 to the outlet bore 30 in the event a fault occurs downstream of the gas safety valve 20.

The side inlet port 52 is consequently not positioned level with the stem axis B but upstream of it. The side inlet port 52 is located upstream of the valve inlet 36 in a position which minimises interference with the valve 32 and the body inlet port 24.

The side inlet port 52 has a side inlet port internal diameter D, which may receive a side port fitting. The junction between the inlet bore 28 and the side inlet port 52 may be positioned such that the distance between the valve inlet 36 and the intersection of the side inlet port axis C and the longitudinal axis A is greater than or equal to a distance of D/2. In other words, a portion of the inlet bore 28 continues between the junction of the side inlet port 52 and the valve inlet 36.

The inlet bore 28 has an inlet bore diameter d at least adjacent the valve inlet. The junction of the inlet bore 28 and the side inlet port 52 may be positioned upstream of the valve inlet 36 at a distance of d or greater from the valve inlet 36. The inlet bore 28 may therefore extend with an inlet bore diameter d from the junction of the side inlet port 52 (and a downstream edge thereof) to the valve inlet 36 for a distance of d or greater, i.e., for a distance of at least the diameter of the inlet bore 28.

This extension of the inlet bore serves to reduce the effects of turbulence on the ball 40 within the valve chamber 34. It helps to ensure that the valve 32 operates in the same way and at the same predetermined pressure difference regardless of which gas source is being used.

The gas safety valve 20 may further comprise a non-return valve fitting 54 mounted in the side inlet port 52 of the valve body 22. The non-return valve fitting 54 may include a cap 56 which is retained to the non-return valve fitting 54 by a flexible retainer 58. The cap may be unscrewed from the non-return valve fitting 54 when the side inlet port 52 is to be connected to a second gas supply. The flexible retainer 58 may prevent the cap 56 from being lost when it is unscrewed from the non-return valve fitting 54.

When the gas safety valve 20 is viewed from above the pressure gauge 48, as shown in FIG. 5, the body inlet port 24 may be said to extend in a 0° direction, whereas the body outlet port may be said to extend in a 180° direction. The side inlet port 52 may therefore be said to extend from the valve body in a 270° direction, as shown in FIG. 5.

By arranging the side inlet port 52 at right angles to the longitudinal axis A of the valve body and right angles to the stem 44 and the pressure gauge 48, the risk of a fitting connecting a first gas supply to the gas safety valve 20 coming undone when attaching and disconnecting a second gas supply via the side inlet port 52 becomes minimised.

Turning now to FIG. 6, another view of the gas safety valve 20 of FIG. 1A is schematically illustrated, with the collar 46 more clearly shown. The gas safety valve 20 is provided with a boss 60 within which the collar 46 is seated. The collar 46 comprises a first end face 62 and second end face 64, wherein the first end face 62 abuts against a base of the boss 60. A central aperture 66, which is in fluid communication with the valve outlet 38, extends from the first end face 62 to the second end face 64 of the collar 46.

The first end face 62 is provided with recesses 68, 70 that together form channels with the base of the boss 60. The recesses 68, 70 include a radially extending recess 68 and an annular recess 70. The radially extending recess 68 fluidly connects the central aperture 66 to the annular recess 70. The valve body 22 is further provided with a return passage 72 that fluidly connects the annular recess 70 to the outlet bore 30.

Figure 7:
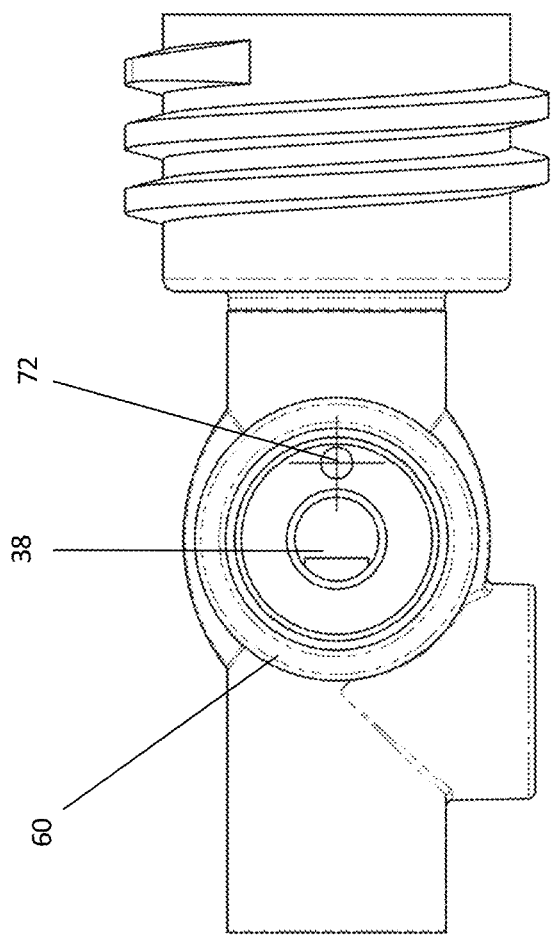
FIG. 7 shows a valve body of a gas safety valve when viewed looking down the stem axis of the gas safety valve, where the stem of the gas safety valve is not present.

FIG. 7 shows the valve body 22 as viewed from above, with the stem 44 not present. The valve outlet 38 and the return passage 72 are both located in the base of the boss 60. The channels formed by the base of the boss 60 and the recesses 68, 70 in the collar 46 allow the valve outlet 38 to be fluidly connected to the return passage 72.

When the ball 40 is positioned away from the valve seat 42, gas entering the gas safety valve 20 can pass through the valve outlet 38 into the central aperture 66 of the collar 46. The gas can then flow from the central aperture 66 into the return passage 72 by passing through the channels formed by the recesses 68, 70. Hence, the collar 46 provides a fluid connection between the valve 32 and the outlet bore 30, allowing gas to pass through the entirety of the gas safety valve 20.

When the ball 40 forms a seal with the valve seat 42, gas cannot pass through the valve outlet 38 and therefore no gas can flow into the return passage 72 through the channels formed by the recesses 68, 70. Consequently, when the ball 40 forms a seal with the valve seat 42, gas is prevented from passing through the entirety of the gas safety valve 20.

The gas safety valve is therefore configured to prevent gas escaping from a fault downstream of the gas safety valve and potentially causing a fire or explosion. This type of gas safety valve provides a simple mechanism for shutting off a gas supply that can also be reset by the user once the fault has been fixed. The gas safety valve also allows a second gas supply to be connected to the gas safety valve and for the second gas supply to use the same safety valve mechanism of the gas safety valve 20 to detect and shut-off the supply of gas in the event that a leak is present in a downstream part of the line. This is achieved through a simple modification of a known gas safety valve while at the same time maintaining the leak-detection performance of the gas safety valve. Other than the provision of the side inlet port 52, the configuration of an existing gas safety valve for a single gas source may be unaffected, allowing existing moulds to be easily modified for casting the valve body 22. The use of a single-piece valve body 22 for a twin gas supply avoids the need for an additional T-piece connector that could potentially be a source of gas leaks, particularly through rotation of such a connector relative to the gas safety valve. Thus, an improved gas safety valve is provided by the present invention.

I claim:

1. A gas safety valve for controlling a gas flow comprising: a valve body providing a body inlet port for coupling to a first gas supply and a body outlet port for coupling to an appliance, the valve body extending along a longitudinal axis between the body inlet port and the body outlet port, the valve body further providing an inlet bore extending downstream from the body inlet port, and an outlet bore extending to the body outlet port; a stem having a stem axis extending away from the valve body, the stem being supported at a first end by a collar mounted to the valve body; a pressure gauge mounted to a second, distal end of the stem for displaying a gas pressure; and a valve provided within the valve body between the inlet bore and the outlet bore, the valve comprising a valve chamber having a valve inlet and a valve outlet, a ball located within the valve chamber and a valve seat provided at the valve outlet such that the ball is retained in the valve chamber upstream of the valve seat, wherein the ball is arranged to: in normal use, rest away from the valve seat to allow a supply of gas to the body outlet port when a pressure difference between the inlet bore and the outlet bore is at an allowable level, or below, where a rate of gas flow in the valve chamber is not sufficient to lift the ball up into contact with the valve seat, and to seal against the valve seat to shut off the supply of gas to the body outlet port when a pressure difference between the inlet bore and the outlet bore exceeds the allowable level and is capable of creating sufficient gas flow through the valve chamber to lift the ball into contact with the valve seat; and wherein the valve body additionally comprises: an internal junction positioned upstream of the valve inlet; and a side inlet port, the side inlet port feeding into the inlet bore at the internal junction for supplying the appliance, when coupled downstream of the gas safety valve, with a second gas supply when the second gas supply is coupled to the side inlet port.

2. The gas safety valve as claimed in claim 1, wherein the side inlet port comprises a side inlet port axis and a side inlet port internal diameter D to receive a side port fitting, wherein in the internal junction where the side inlet port and the inlet bore meet, the side inlet port axis intersects the longitudinal axis at a distance of greater than or equal to D/2 from the valve inlet.

3. The gas safety valve as claimed in claim 1, wherein the inlet bore has an inlet bore diameter d at least adjacent the valve inlet, and wherein a downstream edge of the junction of the inlet bore with the side inlet port is positioned upstream at a distance of d or greater from the valve inlet, such that the inlet bore extends upstream with an inlet bore diameter d for a distance of d or greater from the valve inlet.

4. The gas safety valve as claimed in claim 1, wherein a side inlet fitting is mounted in the side inlet port of the valve body, the side inlet fitting comprising a non-return valve configured to allow gas to enter the inlet bore of the valve body.

5. The gas safety valve as claimed in claim 4, wherein the side inlet fitting comprises a cap which can be unscrewed from the side inlet fitting when the side inlet port is to be coupled to a second gas supply.

6. The gas safety valve as claimed in claim 5, wherein the cap is retained by a flexible retainer to the side inlet fitting to prevent loss of the cap when it has been unscrewed from the side inlet fitting.

7. The gas safety valve as claimed in claim 4, wherein the side inlet fitting extends from the valve body in a 270° direction when the gas safety valve is viewed from above the pressure gauge with the body inlet port extending in a 0° direction and the body outlet port extending in a 180° direction.

8. The gas safety valve as claimed in claim 1, wherein the valve chamber has a bore with an axis aligned with the stem axis, and the valve inlet is defined by an aperture formed in the valve body by the intersection of the inlet bore with the bore of the valve chamber.

9. The gas safety valve as claimed in claim 8, wherein a base of the valve chamber is perpendicular to the stem axis and the intersection of the inlet bore with the bore of the valve chamber defines a substantially D-shaped aperture, through which gas must flow to enter the valve chamber.

10. The gas safety valve as claimed in claim 1, wherein the valve body comprises a casting which has been machined to provide the inlet bore, the outlet bore, the valve chamber, the body inlet port, the side inlet port, the outlet port, internal screw threads for attachment of fittings at the body inlet port and the side inlet port, and wherein the gas safety valve further comprises a body inlet fitting mounted in the body inlet port, which body inlet fitting is provided with a non-return valve and a coupling end configured to couple with the first gas supply.

11. The gas safety valve as claimed in claim 1, wherein the stem is slidably retained within the collar, wherein the stem can be depressed against a bias along the stem axis towards the valve body by a user pressing on the pressure gauge to reset the valve after a pressure difference between the inlet bore and the outlet bore has exceeded the allowable level.

12. The gas safety valve as claimed in claim 11, wherein the first end of the stem is provided with a plunger which can project through the valve seat when the stem is depressed in order to push the ball away from the valve seat to reset the gas safety valve and allow a supply of gas to the body outlet port.

13. The gas safety valve as claimed in claim 1, wherein the valve seat is in the form of a resilient O-ring.

14. The gas safety valve as claimed in claim 1, wherein the collar is seated within a boss of the valve body, such that a first end face of the collar abuts against a base of the boss.

15. The gas safety valve as claimed in claim 14, wherein the first end face of the collar is provided with recesses, wherein the recesses form channels with the base of the boss to guide a supply of gas from the valve outlet to a return passage provided in the valve body that opens into the outlet bore leading to the body outlet port.

16. The gas safety valve as claimed in claim 15, wherein the collar comprises a central aperture extending from the first end face to a second end face of the collar, and wherein the recesses in the first end face of the collar comprise an annular recess and at least one radially extending recess that links the annular recess to the central aperture.

17. A gas supply line comprising: a gas safety valve for controlling a gas flow comprising: a valve body providing a body inlet port for coupling to a first gas supply and a body outlet port for coupling to an appliance, the valve body extending along a longitudinal axis between the body inlet port and the body outlet port, the valve body further providing an inlet bore extending downstream from the body inlet port, and an outlet bore extending to the body outlet port; a stem having a stem axis extending away from the valve body, the stem being supported at a first end by a collar mounted to the valve body; a pressure gauge mounted to a second, distal end of the stem, for displaying a gas pressure; and a valve provided within the valve body between the inlet bore and the outlet bore, the valve comprising a valve chamber having a valve inlet and a valve outlet, a ball located within the valve chamber and a valve seat provided at the valve outlet such that the ball is retained in the valve chamber upstream of the valve seat, wherein the ball is arranged to: in normal use, rest away from the valve seat to allow a supply of gas to the body outlet port when a pressure difference between the inlet bore and the outlet bore is at an allowable level, or below, where a rate of gas flow in the valve chamber is not sufficient to lift the ball up into contact with the valve seat, and to seal against the valve seat to shut off the supply of gas to the body outlet port when a pressure difference between the inlet bore and the outlet bore exceeds the allowable level and is capable of creating sufficient gas flow through the valve chamber to lift the ball into contact with the valve seat; and wherein the valve body additionally comprises: an internal junction positioned upstream of the valve inlet; and a side inlet port, the side inlet port feeding into the inlet bore at the internal junction for supplying the appliance downstream of the gas safety valve, when coupled, with a second gas supply when the second gas supply is coupled to the side inlet port, the gas supply line further comprising: a body inlet fitting mounted in the body inlet port of the gas safety valve; the first gas supply positioned upstream of the gas safety valve and coupled to the body inlet fitting for supplying gas to the gas safety valve; a side inlet fitting mounted in the side inlet port of the gas safety valve; the second gas supply positioned upstream of the gas safety valve and coupled to the side inlet fitting for supplying gas to the gas safety valve; a gas regulator coupled to the body outlet port of the gas safety valve; a gas line coupled to the gas regulator for conveying gas from the gas regulator between an upstream end and a downstream end thereof; and an appliance coupled to the downstream end of the gas line arranged to receive gas from the first or second gas supply.

18. The gas supply line of claim 17, wherein the appliance is any one of a gas barbeque, gas stove, gas heater, gas light, or electrical generator.

19. The gas supply line of claim 17, wherein the side inlet fitting is coupled to the second gas supply by a gas pipe.

20. A method of supplying gas to an appliance using a gas supply line as claimed in claim 17, and supplying gas from at least one of the first gas supply or the second gas supply to the appliance in a controlled manner, whereby if gas escapes the gas supply line as a result of a leak or a fault in the appliance, gas from the first and second gas supplies is shut off from the appliance at the gas safety valve.

* * * * *